United States Patent
Norrman et al.

(10) Patent No.: US 10,091,175 B2
(45) Date of Patent: Oct. 2, 2018

(54) AUTHENTICATING A DEVICE IN A NETWORK

(71) Applicant: Telefonaktiebolaget LM Ericsson (publ), Stockholm (SE)

(72) Inventors: Karl Norrman, Stockholm (SE); Rolf Blom, Järfälla (SE); Mats Näslund, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 15 days.

(21) Appl. No.: 15/057,809

(22) Filed: Mar. 1, 2016

(65) Prior Publication Data

US 2016/0183091 A1 Jun. 23, 2016

Related U.S. Application Data

(63) Continuation of application No. 14/113,047, filed as application No. PCT/EP2011/056684 on Apr. 27, 2011, now Pat. No. 9,407,616.

(51) Int. Cl.
*G06F 7/04* (2006.01)
*G06F 15/16* (2006.01)
(Continued)

(52) U.S. Cl.
CPC .......... *H04L 63/08* (2013.01); *H04L 63/0876* (2013.01); *H04L 63/20* (2013.01);
(Continued)

(58) Field of Classification Search
CPC .... H04W 12/06; H04W 12/04; H04L 9/0891; H04L 9/0844; H04L 2209/80; H04L 63/068

See application file for complete search history.

(56) References Cited

U.S. PATENT DOCUMENTS

| 7,158,777 B2 | 1/2007 | Lee et al. |
| 7,373,508 B1 | 5/2008 | Meier et al. |

(Continued)

OTHER PUBLICATIONS

Lin, et al., "Authentication Schemes Based on the EAP-SIM Mechanism in GSM-WLAN Heterogeneous Mobile Networks", 2009 Fifth International Joint Conference on INC, IMS, and IDC; IEEE; Aug. 25, 2009. pp. 2089-2094. Piscataway, NJ, USA.

(Continued)

*Primary Examiner* — Morshed Mehedi
*Assistant Examiner* — Vadim Savenkov
(74) *Attorney, Agent, or Firm* — Murphy, Bilak & Homiller, PLLC

(57) ABSTRACT

A mobile device and an authentication server are configured to re-establish a security context that was previously established using an Authentication Key Agreement (AKA) procedure. The re-establishment advantageously uses re-use information saved from the preceding AKA procedure, including using synchronization information for each such re-establishment that occurs between AKA procedures. The synchronization information particularly identifies each instance of re-establishment and depends on a sequence number assigned to the preceding AKA procedure and on any previous instances of re-establishing the security context.

12 Claims, 3 Drawing Sheets

(51) Int. Cl.
*G06F 17/30* (2006.01)
*H04L 29/06* (2006.01)
*H04W 12/06* (2009.01)
*H04W 12/04* (2009.01)

(52) U.S. Cl.
CPC .......... *H04W 12/04* (2013.01); *H04W 12/06* (2013.01); *H04L 63/062* (2013.01)

(56) References Cited

U.S. PATENT DOCUMENTS

| | | | |
|---|---|---|---|
| 8,201,233 B2* | 6/2012 | Beaulieu | H04L 9/0844 341/67 |
| 2004/0179690 A1 | 9/2004 | Soliman | |
| 2007/0008937 A1 | 1/2007 | Mody et al. | |
| 2009/0235338 A1* | 9/2009 | Sheehan | H04L 9/0891 726/5 |
| 2010/0017603 A1* | 1/2010 | Jones | H04L 9/0844 713/168 |

OTHER PUBLICATIONS

Unknown, Author, "EAP SIM and EAP AKA Re-authentication," 3GPP TSG SA2 #27; S2-022856; Nokia; Oct. 14-18, 2002. pp. 1-4. Beijing, China.

* cited by examiner

AUTHENTICATING A DEVICE IN A NETWORK

RELATED APPLICATIONS

This application is a continuation of co-pending U.S. patent application Ser. No. 14/113,047, filed 21 Oct. 2013, which is a national stage entry under 35 U.S.C. § 371 of international patent application serial no. PCT/EP2011/056684, filed 27 Apr. 2011. The entire contents of each of the aforementioned applications is incorporated herein by reference.

TECHNICAL FIELD

The present invention relates to authentication of a device in a network.

BACKGROUND

Existing standards for mobile networks provide for protection of communication between a serving network and a terminal based on a security context created as a result of successful Authentication and Key Agreement (AKA). For example, AKA is the mechanism used to perform authentication and session key distribution in Universal Mobile Telecommunications System (UMTS) and Long Term Evolution (LTE) networks. AKA requires that a pre-shared key K is stored in the terminal (e.g. USIM card) and an authentication server, AS (for example a Home Subscriber Server, HSS, in the home network of the terminal).

Based on a subscriber/terminal identity (e.g. International Mobile Subscriber Identity (IMSI)), the serving network (using the terminal's identity) requests the following data from the AS: a random challenge (RAND), an authentication token (AUTN), an expected response (XRES) and a set of keys. These keys correspond in UMTS to Ck, Ik (see below).

The random challenge and the authentication token (which provides replay protection and enables the terminal to authenticate the network) are sent to the terminal via the serving network.

The USIM at the terminal verifies AUTN and computes two values from RAND: a set of keys (Ck, Ik), and a response. RES.

RES is sent back to the serving network, which verifies that the response RES is as expected (i.e. it matches XRES) and, if so, draws the conclusion that it has been received from the expected sender. If so, the terminal is considered authenticated and subsequent data exchange is protected using the set of keys.

AKA thus creates fresh session keys (Ck, Ik) used for security (encrypting/authenticating) communication between the terminal and serving network.

This freshness is essential for security. The session keys together with any additional state necessary to secure the communication between the terminal and the network are referred to below as the security context.

Cellular technology such as LTE, including its basic security features, is for many reasons attractive to re-use for machine-to-machine communication (M2M). In many cases M2M devices (MDs) will communicate with the network (and with each other) relatively infrequently, yet security must be provided.

There are problems with the current 3GPP security solutions as they are, because one of the following options must be used to establish a security context for protection of the traffic between the MD and the network, and each has significant drawbacks:

A security context can be kept in the serving network for each device, but this may lead to the requirement to store very large numbers of security contexts, most of which are very seldom going to be used.

On the other hand, if MDs run AKA each time they wish to communicate, it will have an impact on MD battery power and create additional delays and possible signaling overload in the network.

Re-using the fixed pre-shared key in the AS directly (without running AKA at all) implies that, if the key is broken, all future and past sessions are insecure. If, on the other hand, a key derived from AKA is broken, only the session protected by that particular key is compromised.

Public key technology is ruled out for two reasons: computational/communication overhead and/or the need for the MD to keep a reasonably accurate clock for replay protection. (Without a time-based mechanism, at least three exchanges between MD and network would be needed to obtain replay protection, which is not signaling-compatible with the 2-pass AKA protocol). In addition, there are practical problems with keeping a Public Key Infrastructure (PKI) (e.g. deployment, who shall be the certifying authority, etc.) which arise when there are multiple parties involved (MD manufacturers, network equipment manufacturers and operators).

In the situation where an MD and the network have already once shared a security context, it may be possible to efficiently re-establish a new security context based on the previously shared one. It should be noted that IETF adaptations of (U) SIM based authentication (known as EAP SIM and EAP AKA, respectively) have provisions for a so-called fast re-authentication procedure. However, these protocols have several shortcomings:

The re-authentication procedure is always triggered from the network side and, following this trigger, there are at least four message exchanges between the device and the network, totaling 2.5 roundtrips.

There is no guarantee that the protocol succeeds in 2.5 roundtrips because the so-called "fast re-authentication identities" may be modified by intermediate Authentication, Authorization and Accounting (AAA) proxies. In this case, an additional (full) roundtrip with an explicit Identity Request is needed.

There is no guarantee that fast re-authentication is even possible since it is based on the MD having such an (unused) fast re-authentication identity available (which may not always be the case).

The procedure is not (optimally) resistant to denial-of-service since the first message from the device is not authenticated.

It would therefore be desirable to provide a system which enables secure communication to be re-established quickly, but without the requirement for large numbers of security contexts to be stored unnecessarily.

SUMMARY

In accordance with one aspect of the present invention there is provided a device for communicating with a network. The device comprises a communications unit for sending and receiving data, a storage unit for storing data, and a control unit for controlling operation of the communications unit and storage unit. The device is configured so that a secret and a random value have been used to establish a first security context with a serving network node, assisted by an authentication server, where the secret is stored by an identity module associated with the device and shared with the authentication server. The storage unit is configured to store at least one of the random value and a first re-use information associated with the first security context. The control unit is configured so that, if the device requires secure communication with the network and it is known or suspected that the first security context is not available in the network outside the authentication server (and device), a context regeneration request is generated, and authenticated at least partly based on the secret. The communications unit is configured to send the context regeneration request towards the serving network node or another serving network node. The control unit is configured to generate a second security context based on at least the secret and at least one of the first re-use information and second re-use information. The control unit is configured to use the second security context to protect data exchanged with the network.

The context regeneration request may be generated using second re-use information, the second re-use information having been stored by the storage unit or generated by the control unit. Alternatively, the second re-use information may be a nonce provided by the authentication server or serving network node.

The control unit may be further configured to attach a user identifier obtained from the identity module to the context regeneration request.

The first security context may be used to authenticate and secure data exchanged with the network if less than a predetermined time has elapsed after the first security context has been established, and the second security context may be established only if more than the predetermined time has elapsed after the first security context has been established.

At least one of the first and second re-use information may comprise the random value.

The second re-use information may comprise secondary synchronization information identifying the incidence of the establishment of the second security context. The secondary synchronization information may comprise a sequence number. The device of any preceding claim, wherein the first re-use information may include a primary sequence number or an encoding of a primary sequence number identifying the incidence of the establishment of the first security context. The secondary synchronization information may be derived using an encoding of the primary sequence number.

The second re-use information may comprise a nonce generated by the control unit.

The control unit may be configured to include at least one of the first re-use information and the second re-use information explicitly in the context regeneration request.

The communications unit may be configured to send data protected by the second security context with the context generation message.

If the device requires secure communication with the network at a later time, the control unit may generate a further context regeneration request using third re-use information, the third re-use information having been stored by the storage unit or generated by the control unit following the use of the second re-use information, and authenticated at least partly based on the secret. The communications unit may send the further context regeneration request towards the serving network node. The control unit may generate a third security context based on at least the secret, at least one of the encoding of the first re-use information and the third re-use information. The third security context may be used to protect data exchanged with the network.

The device may be configured to support the establishment of the first security context using an Authentication and Key Agreement (AKA) procedure.

In accordance with another aspect of the present invention there is provided a serving network node. The node comprises a communications unit for sending and receiving data, a storage unit for storing data, and a control unit for controlling operation of the communications unit and storage unit. The communications unit is configured to communicate with a device in the network and an authentication server to establish a first security context for the device based on a random value and a secret shared between an identity module associated with the device and the authentication server. The storage unit is configured to store the first security context or some cryptographic key associated therewith. The control unit is configured, after a period of time, to instruct the storage unit to delete at least some of the first security context and/or the cryptographic key. The communications unit is configured to receive a context regeneration request from the device after the cryptographic key and/or at least some of the first security context has been deleted, the context regeneration request having been generated by the device and authenticated at least partly based on the secret. The communications unit is configured to send the context regeneration request to the authentication server, and to receive at least a second security context from the authentication server in response. The control unit is configured to use the second security context to protect data exchanged with the device.

It will be appreciated that the first security context established by the serving network node in this aspect of the invention need not be identical to the security context stored by the device in the previous aspect of the invention. For example, the version of the context stored by the device may include some sequence numbers not included in the version stored by the serving node. Similarly, the authentication server may have another version again of the security context.

The storage unit may be configured to store at least one of the random number and the first re-use information when the first security context is stored. The storage unit may also be configured not to delete the random number and/or first re-use information when the first security context and/or cryptographic key is deleted. The control unit may be configured to add the random number and/or first re-use information to the context regeneration request before it is sent to the authentication server.

If data protected by the second security context is received with the context regeneration request, the protected data may be stored by the storage unit until the second security context has been received from the authentication server.

The control unit may be further configured to cryptographically process (e.g., verify and/or decrypt) the data protected based on the second security context.

The communications unit may be further configured to receive a nonce from the authentication server and forward the nonce to the device, or the control unit may be configured to generate a nonce and the communications unit configured to forward the nonce to the authentication server and to the device.

In accordance with another aspect of the present invention there is provided an authentication server for use in a network. The authentication server comprises a communications unit for sending and receiving data, a storage unit for storing data, and a control unit for controlling operation of the communications unit and storage unit. The storage unit is configured to store a secret shared with an identity module associated with a device in the network. In response to a request from a serving network node, the control unit and communications unit are configured to use a random value and the secret to establish a first security context for use by the device and the serving network node, and send the first security context to the serving network node. The storage unit is configured to store the first re-use information associated with the first security context. The communications unit is configured to receive a context regeneration request from the serving network node or another serving network node, at least part of the context regeneration request having been generated by the device and authenticated based on the secret and including an identifier of the identity module. The control unit is configured to verify the authentication of the context regeneration request and, if verification is successful, generate a second security context based on at least the secret, the random value, the first re-use information and second re-use information (which may have been used in the generation of the context regeneration request). The communications unit is configured to send the second security context to the serving network node.

The context regeneration request may have been generated using the second re-use information.

The control unit may be configured to mark the second re-use information as used after the second security context has been sent to the serving network node.

The first security context may be stored by the storage unit.

The control unit may be configured to generate a nonce and the communications unit configured to forward the nonce to the serving network node for use by the device in generating the second security context.

In accordance with another aspect of the present invention there is provided a method of operating a device in a network when a secret stored by an identity module associated with the device and shared with an authentication server has been used to establish a first security context with a serving network node, assisted by the authentication server. The method comprises storing at least one of the random value and first re-use information associated with the first security context. If the device requires secure communication with the network and it is known or suspected that the first security context is not available in the network outside the authentication server and device, a context regeneration request is generated, and authenticated at least partly based on the secret. The context regeneration request is sent towards the serving network node or another serving network node. A second security context is generated based on at least the secret and at least one of the first re-use information and the second re-use information. The second security context is used to authenticate and secure data exchanged with the network.

In accordance with another aspect of the present invention there is provided a method of operating a serving network node. The method comprises communicating with a device in the network and an authentication server to establish a first security context for the device based on a random value and a secret shared between an identity module associated with the device and the authentication server. The method further comprises storing the first security context or a cryptographic key associated therewith. After a period of time, at least one of the first security context and/or the cryptographic key is deleted. After the at least one of the first security context and/or the cryptographic key has been deleted, a context regeneration request is received from the device, the context regeneration having been generated by the device and authenticated based at least partly on the secret. The context regeneration request is sent to the authentication server. In response, at least a second security context is received from the authentication server. The second security context is used to protect data exchanged with the device.

In accordance with another aspect of the present invention there is provided a method of operating an authentication server having stored thereon a secret shared with an identity module associated with a device in a network. The method comprises, in response to a request from a serving network node, using a random value and the secret to establish a first security context for use by the device and the serving network node, and sending the first security context to the serving network node. The method further comprises storing the first re-use information associated with the first security context. A context regeneration request is received from the serving network node or another serving network node, the context regeneration request having been generated by the device, authenticated based at least partly on the secret, and including an identifier of the identity module. The authentication of the context regeneration request is verified. If verification is successful, a second security context is generated based on at least the secret, the random value, the first re-use information and second re-use information. The second security context is sent to the serving network node.

In accordance with another aspect of the present invention there is provided a method for establishing a second security context between a device and a serving network node when a first security context has previously been established, assisted by an authentication server, based on a random value and a secret shared between an identity module associated with the device and the authentication server. The method comprises storing, at the authentication server and at the device, first re-use information from the establishment of the first security context, the first re-use information enabling secure generation of the second security context from the random value and the secret. Second re-use information is generated or stored at the device. A context regeneration request is generated at the device from the second re-use information, the context regeneration request authenticated at least partly based on the secret. The context regeneration request is sent to the serving network node. The context regeneration request is sent from the serving network node to the authentication server. The context regeneration request is verified at the authentication server. The second security context is generated at the authentication server based on at least the secret, the random value, and the first and second re-use information. The second security context is communicated from the authentication server to the serving network node.

The method may further comprise generating the second security context at the device based on at least the secret, the random value, and the first and second re-use information.

A pre-determined relationship between said first and second re-use information may be verified at the authentication server before the second security context is generated.

The first and second re-use information in combination may comprise a statistically unique value.

The random value may be included in at least one of said first and second re-use information.

The invention also provides a computer program, comprising computer readable code which, when operated by a device, serving network node or authentication server, causes the device, serving network node or authentication server to operate as a device, serving network node or authentication server as described above. The invention also provides a computer program product comprising a computer readable medium and such a computer program, wherein the computer program is stored on the computer readable medium.

BRIEF DESCRIPTION OF THE DRAWINGS

Some preferred embodiments of the invention will now be described by way of example only and with reference to the accompanying drawings, in which.

DETAILED DESCRIPTION

Embodiments of the invention are described below in the context of MDs connecting to a LTE network, although it will be apparent to one skilled in the art that the invention may apply equally well to many other contexts using pre-shared keys. In the general case, the Home Subscriber Service "HSS" corresponds to a general Authentication Sever, AS, the M2M device "MD" corresponds to any (possibly mobile) device/terminal, and the Mobility Management Entity "MME" corresponds to any node in a serving network in charge of initiating and verifying the success of the authentication. There may also be "access points". e.g. radio base station performing parts of the session security in the serving network.

Figure 1:
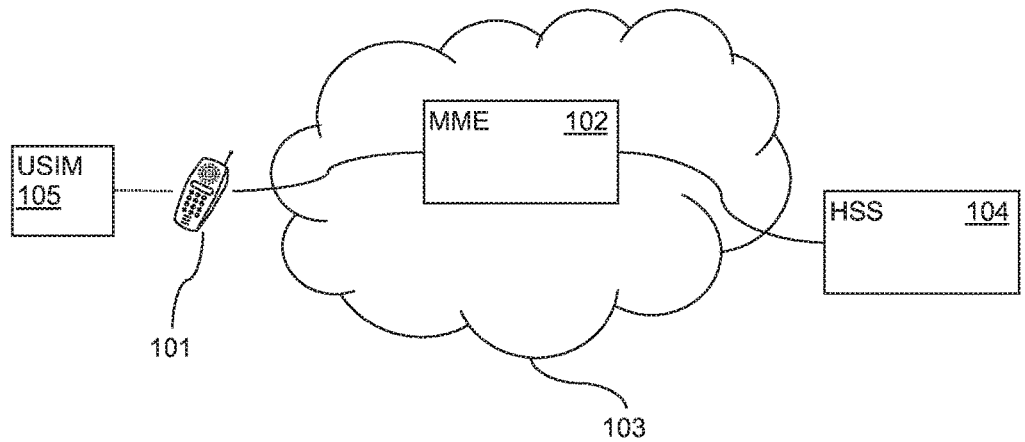
FIG. 1 is a schematic illustration of elements of a network.

FIG. 1 is a schematic illustration of some elements in a network. A MD 101 contacts a MME 102 in a serving network 103. The MME 102 is in contact with an HSS 104. The MD is associated with a USIM 105. It will be appreciated that an identity module such as a USIM may be an external hardware module, or may be provided as software which could be installed onto the MD itself, possibly enabling password based authorization. So in some arrangements it may be possible for the MD to have direct access to a secret stored on or by the identity module, but in other arrangements the secret may not be available directly to the MD.

AKA is used, as described in the introduction above, to establish an initial security context. In the discussion below, the term KA is used to denote a key-pair (i.e. Ck. Ik) produced by the USIM 105 or a key derived therefrom. KM denotes the key in the security context transferred to the MME, e.g. KM=KDF(KA, . . . ). (In LTE notation, KM is called $K_{ASME}$.) Here, KDF denotes a Key Derivation Function with suitable security properties.

Process for Re-Establishing Secure Communication

Figure 2:
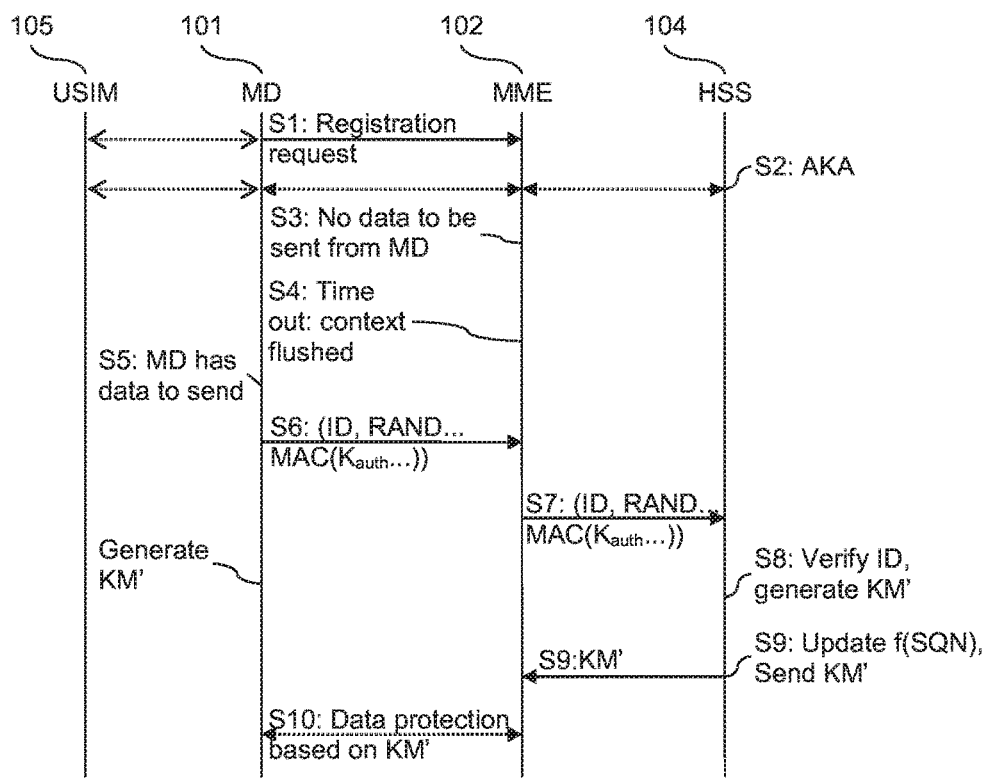
FIG. 2 is a signaling chart illustrating the steps involved in establishing an initial security context and subsequently re-establishing a security context.

In order to re-establish secure connections quickly without the need to store large numbers of security contexts, the following discussion explains how it is possible to establish a security context using AKA and store enough of that context to enable quick re-establishment of secure communication. FIG. 2 is a signaling diagram outlining how this may be achieved.

S1. When the MD 101 powers on, it registers with the network (MME 102).

S2. AKA is performed as described above: the MME 102 fetches from the HSS 104 a random challenge, authentication token, expected response and a (set of) key(s) (RAND, AUTN, XRES, KM) and authenticates the MD. This creates a context (a first security context) including a KM in the MME 102 and MD 101. The MD (having also generated KA) keeps KA. RAND and the associated sequence number (SQN) of the authentication, which is also encoded in AUTN. SQN is referred to hereinafter as the primary sequence number, and is a unique identification of a particular execution of an AKA process. The HSS may also keep RAND and KA in association with SQN in some embodiments.

It should be noted that, in some implementations, SQN may not be known in the MD outside the USIM 105. In this case, the MD 101 will have possession of an encoding of SQN which may, for example, be generated by an XOR function of SQN with the so called anonymity key AK. Subsequent discussions of the primary sequence number should therefore be understood to include either SQN or an encoded version of SQN. The important property is that the primary sequence number can be used by the MD, the AS and the HSS to identify the AKA process (which holds also if e.g. SQN XOR AK is used).

S3. The MD 101 may not have data to send immediately, and a period of time may elapse after AKA has been performed. It will be appreciated that performing a full initial AKA has the benefit that the MME 102 cannot be fooled into storing a context for a non-authentic MD at this point.

S4. If the MD 101 does not send any data and there has been no downlink data towards the MD within a pre-defined time limit, the MME 102 removes at least part of the security context associated with the MD. The purpose of this action by the MME is to save storage space. In some embodiments, the MME 102 may keep RAND or RES, for example, but this is not usually necessary and in some embodiments the whole security context may be deleted from the MME 102. However, the MD 101 maintains at least KA and SQN (or SQN XOR AK), and possibly also the whole context including KM and/or RAND. The information retained in addition to the context can be seen as "first re-use information".

S5. At a (possibly much) later time the MD 101 has data to be sent in a secure way. This data is typically to be protected by a key derived from KM.

S6. To this end, the MD 101 sends to the MME 102 a context regeneration message including at least the following "second re-use" information: (ID. MAC($K_{auth}$, f(SQN)) where ID is a device or USIM identity (e.g. IMSI). MAC is a message authentication code, $K_{auth}$ is an authentication key which may be derived from KA, and f(x) is some predefined function modifying x. e.g. f(x)=x+1, f(SQN) is a secondary sequence number, and identifies each incidence of the re-use of the authentication derived from the AKA procedure. Thus for the first re-use it may be that f(x)=x+1, and for the second re-use f(x)=x+2, etc., although it will be appreciated that other functions or mappings may be envisaged. Where an encoded version of SQN is retained by the MD, f(SQN) would more accurately be written as e.g. f(SQN XOR AK) but for simplicity it is referred to as f(SQN) hereinbelow. In general, the secondary sequence number will be associated with the primary sequence number SQN (for example indirectly via the encoded version of SQN), but even this is not necessary in all embodiments. The function f( ) may also take further input parameters that are known to the HSS 104. e.g., RAND. Depending on the choice of f( ), the value f(SQN) may also be explicitly included in the message.

Even though the term "secondary sequence number" suggests that it must be a number, it may in practice be any bit string providing freshness guarantees to the MME 102 with respect to the MAC (e.g. a time stamp could also be used), and may therefore more generally be considered to be some form of synchronization information. As another alternative, this "secondary" synchronization information could, for this first re-establishment, be assigned an initial value by a function $f_{init}()$. This could be done by assigning zero, $f_{init}()=0$, (or any other constant or even a random value, or any other value known to both peers) to the secondary synchronization information, or assigning a value based on SQN, e.g. $f_{init}(SQN)$.

The value RAND may also be included in the message (although it can be omitted if it can be assumed that the HSS 104 or MME 102 stores it). RAND may also be included in the calculation of MAC. Similarly. SQN (or the encoded version thereof) can be included explicitly in the message and/or included in MAC. So in some embodiments the context regeneration message sent from the MD 101 may take the form (ID, RAND, SQN, f(SQN), MAC($K_{auth}$, RAND, SQN, f(SQN))).

This message may also contain protected data (for example application data), since it will be assumed that the MME 102 will be able to authenticate the MD 101 quickly and obtain the necessary keys to decode such data almost immediately. Alternative, the protected data could also be sent in a subsequent message.

There are a number of possible mechanisms to ensure that the MD 101 knows whether to include this new information so as to resume the session. One possibility is that the MME 102 informs the MD 101 explicitly via a message when it deletes some or all of the security context. Alternatively, the MD 101 may know to send this information if the session is to be resumed more than a predetermined time (fixed or configurable) after the most recent AKA procedure. Another option is for the MD 101 to include the new information in every message, but there is a danger that this would waste a lot of bandwidth.

S7. If the MME 102 has deleted the context (which is likely) it cannot immediately verify the message. Instead, it sends a minimum of (ID, MAC($K_{auth}$, f(SQN)) to the HSS 104. If it has also received RAND, f(SQN), or SQN (or retained RAND) then these may be included in the message sent to the HSS 104. Similarly, if RAND and/or SQN (or the encoded version thereof) were used in the creation of MAC, then the MAC sent to the HSS will take the form MAC($K_{auth}$, RAND, f(SQN)) or MAC($K_{auth}$, SQN, f(SQN)) or MAC($K_{auth}$, RAND, SQN, f(SQN)).

S8. The HSS 104 retrieves data associated with ID and SQN and/or f(SQN) and, in particular, the pre-shared key KM and the local copy of SQN (or the encoded version). Using this, the HSS 104 verifies the message (if needed by on-the fly re-generation of KA/KM. $K_{auth}$ and checking that f(SQN) is as expected, i.e. it corresponds to the number of times this particular AKA output has been re-used).

S9. If the contents of the message are as expected, the HSS 104 may also marks f(SQN) as used for replay protection purposes. However, SQN itself need not be updated in the HSS 104. The HSS 104 replies to the MME 102 with a re-generated KM', which is a second security context. KM' may or may not be identical to KM, as discussed below. This step may also comprise a replay check, as discussed below.

S10. The MME 102 now has in its possession the necessary key, KM', to protect communication with the MD 101. The MD can locally generate the same KM' in a number of possible ways as will be discussed further below. Typically, further keys may also be derived from KM' (locally in the serving network), e.g., to be used with cryptographic data protection algorithms. Some of these keys may (as in the case of LTE) be transferred to other nodes in the serving network such as a Radio Base Station (RBS).

If there is a later need to re-generate new keys (e.g. after yet another period of silence from the MD 101), the protocol is re-run to create a new (at least statistically) unique secondary sequence number or other synchronization information. The word unique shall here be understood to mean unique in the context of a session. Where f(SQN) was originally used, this time the previous secondary sequence number is input to the function to create a new unique secondary sequence number, e.g. f(f(x))=x+2. Thus, the MD can keep track of which secondary sequence numbers have been consumed for a given primary sequence number. The choice of f(x)=x+1, makes this particularly easy. In this case f(x) could simply correspond to the number of re-establishments, i.e. f(x)=1 is used on the first re-establishment, f(x)=2 on the second, and so on. Preferably, as discussed above, the MD 101 then includes both SQN and f(SQN) in the re-generation request sent towards the HSS 104.

Where the secondary synchronization information was generated the first time using a function of the type $f_{init}()$, on subsequent re-establishments it can be ensured that the secondary synchronization information attains a unique (or at least statistically unique) value that has (with high probability) not occurred for any previous re-establishment by using a function $$secondary\_synch = f_{update}(secondary\_synch).$$

This can be achieved by using an update function $f_{update}(x)$ of form $f_{update}(x)=x+c$ for some constant c (e.g. c=1) or any other function ensuring (with high probability) uniqueness, e.g. a permutation or a random assignment function. The update function acts upon the variable secondary_synch, assigning it a new value.

It will be appreciated that, if KM'=KM, the process above can be viewed as re-creating an old security context or key. However, it is also possible, and may well be desirable, to refresh KM' so that KM' has freshness and is cryptographically independent of KM. In both cases, since no explicit AKA is performed, the process can still be seen as a (secure) resumption of an old context/key. It will be noted that, where KM'=KM, sequence numbers used by the bulk protection protocols cannot be reset unless there is further freshness input to the bulk protection protocol keys themselves. This is discussed below.

Additional Signaling Possibilities

If the MME 102 decides to delete one or more MD specific context(s) (e.g., due to a timer expiring), the MME 102 may optionally notify the MD(s) 101 about this, if possible via a secured (authenticated) broadcast or multicast message. Broadcast or multicast would be useful for the case where the security contexts for multiple MDs expire simultaneously. Although there is no guarantee the MD(s) in question will receive such messages (their receivers may be turned off to conserve battery life), it at least helps those MDs that are listening so that they know on the next data transfer that they cannot assume a context is in place in the network. MDs that do not receive the message can be equipped with a timer of their own. If this timer expires, they assume that the MME has flushed the security context. A further option is for MDs to resume their session every n:th time unit. e.g., every 24 hours. This approach avoids the need for the MD 101 to use a specific timer keeping track of the last AKA run.

Yet another possible event is that the MD 101 incorrectly judges that the security context is kept by the MME 102. If that happens, the MME 102 may send a REJECT message which then triggers the above re-generation message from the MD 101. This could however have security problems since it is not possible to authenticate such a REJECT message. Furthermore, it could happen that the next transmission is a downlink message, from network to terminal (this of course assumes the MD is listening, at least to paging). If a context exists in the MME, that can be used to protect the downlink. However, if not, a (fresh) context is needed. Two options exist.

The MME 102 may fetch a completely new set of AKA parameters from the HSS 104 and ask the MD 101 to run a new AKA. In this case, the protected data may be sent to the MD either before, in conjunction with, or (preferably) after the AKA and associated Security Mode Control (SMC) procedure. The MD 101 will in this case replace the old context with the new after the AKA and SMC run. The MD will similarly replace/update the SQN (or the encoding thereof).

The MME can send a request to the MD 101 and ask it to initiate the process described above with reference to FIG. 2. A special flag set in a paging message could be an indicator to the MD 101 to initiate the process. Once steps S1 to S9 above have been carried out, data is then transmitted on the downlink at any time in or after step S10.

Key Freshness

Figure 3:
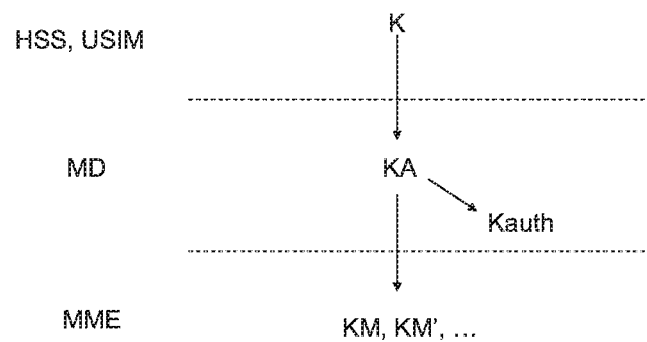
FIG. 3 illustrates a key hierarchy.

FIG. 3 illustrates the hierarchy of the keys discussed above. Names to the left indicate which entities that know the corresponding key. Knowing a key higher in the key hierarchy implies knowing also all keys lower in the key hierarchy. Thus, MD 101 knows (or can derive) KA. $K_{auth}$ and KM, but not K, etc.

As noted, there may typically be further session keys, $K_{sess}$, below (derived from) KM, KM', e.g. link layer keys for data protection. Fundamentally, these lowest keys must be fresh to guarantee security. There are a number of ways to ensure this. A key is considered to be below another key if it is derived from the second key.

Clearly, ensuring a fresh KM' each time ensures that any lower keys are also fresh. Four options are discussed below for ensuring freshness of KM', although it will be appreciated that other approaches may also be possible. These may be used in combination with each other if so desired. In particular, it is in almost all cases a bad idea to use a single sided nonce protocol. The reason for this is that the party that does not include a nonce will not get freshness guarantees on the key and a key-re-use attack may be possible.

(1) KM' Based on Secondary Sequence Number.

Since the keys used to protect data need to be fresh, the simplest approach is to ensure that a fresh KM' will be always transferred to the MME.

To this end, the HSS 104 in steps S8 and S9 above (and the MD 101) may derive KM' as $$KM'=KDF(KA, f(SQN), \ldots).$$

Since it is required that the same secondary sequence number f(SQN) is never used twice for a given primary sequence number SQN (and thus for the same KA), this ensures that each KM' is fresh.

(2) KM' Based on Nonce Provided by MD

Using this approach, the MD 101 adds a random nonce, $nonce_{MD}$ to the message in step S6 ($nonce_{MD}$ may be authenticated by the MD using e.g. $K_{auth}$).

The HSS in steps S8 and S9 (and the MD) may derive KM' as $$KM'=KDF(KA, \ldots, nonce_{MD}, \ldots).$$

The $nonce_{MD}$ here fills the same freshness purpose as the secondary sequence number (f(SQN)) in option (1) above. In other words, the $nonce_{MD}$ or the secondary sequence number are both examples of a more general secondary synchronization parameter.

(3) KM' Based on Nonce Provided by HSS

This approach is similar to that of option (2), except that the nonce is chosen or provided by the HSS 104 in step S8 and S9. Thus, the HSS 104 in steps S8/S9 derives KM' as $$KM'=KDF(KA, \ldots, nonce_{HSS}, \ldots).$$

This value $nonce_{HSS}$ is then communicated via the MME 102 in steps S9/S10 (preferably authenticated by the HSS 104) to the MD so that the MD can generate the same key.

The $nonce_{HSS}$ here fills the same freshness purpose as the secondary sequence number (f(SQN)).

(4) KM' Based on Nonce Provided by MME

This approach is similar to that of option (3), except that the nonce is chosen or provided by the MME 102, which includes it in the request to the HSS 104 in step S7. Thus, the HSS in steps S8/S9 derives KM' as $$KM'=KDF(KA, \ldots, nonce_{MME}, \ldots).$$

This value $nonce_{MME}$ is then communicated also to the MD 101 so that the MD can generate the same key.

The $nonce_{MME}$ here fills the same freshness purpose as the secondary sequence number (f(SQN)).

If it is, on the contrary, required that KM'=KM, then it becomes necessary to ensure that data session keys/contexts are not reused in the bulk protection protocols. To this end, two possibilities exist:

(1) A term (e.g. designated) COUNT may be associated with the message sequence number(s) most recently used in a message between the MD 101 and the network (separate COUNTS are typically used for uplink/downlink). The MD 101 remembers the most recent sequence numbers (COUNTs) used and continues from a COUNT value which is at a known distance from the previous COUNTs. They could continue from e.g., COUNT+n, for some constant n, e.g. n=1.

(2) A slightly more robust approach may be to start from the next multiple of 10, for example. The reason this is more robust is that, even if the network and the MD have a different idea of what the previous values for the COUNTs are (e.g., due to packets being lost in transmission), they will usually have the same idea of what the next multiple of 10 is. If this approach is used the MD 101 should include the value of the COUNTs in signaling to the network.

(3) The actual session keys which are input to ciphering/integrity algorithms are refreshed by re-computing them from KM'. This can be accomplished by, e.g.

$$Ksess=g(KM', nonce, \ldots)$$

Where the nonce is some unique value (random or some counter) and g is a suitable key derivation function.

It will be appreciated that, even though it is written as if KA and KM' are directly input to the functions KDF and g, it is easily seen by the man skilled in the art that a key derived from KA or KM' is equally suitable as input.

RAND and Sequence Number Handling

Primary sequence numbers (SQN) values are handled in the manner discussed in 3GPP TS 33.102: each time a new AKA is executed, SQN is typically increased by one and a new fresh RAND is selected. It is noted that the secondary sequence (f(SQN)) may be any combination of freshness parameters discussed above.

When re-creating or resuming an old key/context, SQN maintains its value, i.e. SQN is associated with the AKA-run that was the basis for forming the initial KA/KM'. However, for each such resume/re-create, it is required that the secondary sequence number has a new, unique value. So the pair (primary sequence number, secondary sequence number)=(SQN, f(SQN)) must uniquely identify the KM' key/context for a particular MD.

Since SQN is fixed on re-establishment, it is therefore required that the sequence of secondary sequence number (which is typically of the form f(SQN), f(f(SQN)), . . . ) does not repeat. Or, in the case of sufficiently long (pseudo) randomly generated nonces, repeats with a negligible probability.

While many functions f( ) are thus possible, to simplify management of the secondary SQN, it is therefore proposed that f(x) is some simple function ensuring this uniqueness, e.g. f(x)=x+1. Another option is to let the first secondary sequence number always be zero and then use secondary SQNs 1, 2, . . . . The MD/HSS would then use an "implicit" secondary SQN of zero on the first re-create/resume, or the MD 101 could explicitly signal to the HSS 104 (via the MME 102) which secondary sequence number it wishes to use.

In any case, when considering re-creation/resume of keys by the HSS 104, the HSS should verify that the secondary sequence number in question has not been used before. The HSS 104 could "tick off" each secondary sequence number as it is consumed and/or only permit secondary SQNs which are higher than the highest previously used secondary SQN. This means that for each subscriber, the HSS 104 only needs to maintain the following details:

$(K, SQN, [RAND_{SQN},]SECSQN_{max})$ where $RAND_{SQN}$ is the RAND associated with the most recent AKA run (using a certain primary sequence number (SQN)) and $SECSQN_{max}$ is the highest observed secondary sequence number for the given SQN. Since the HSS 104 must in any case maintain at least K and SQN, the extra overhead is very small, only 20 bytes (16 for $RAND_{SQN}$ and 4 four SECSQNmax). As noted, it may be possible to omit $RAND_{SQN}$ if the MD 101 is assumed to always include it in the signaling.

The table below shows an example of storage in the HSS, where only the fourth and optionally fifth columns have been added by the process described above.

| MD ID | Key | SQN | Secondary sequence number | RAND |
|---|---|---|---|---|
| ID1 | K1 | SQN1 | sSQN1 | RAND1 |
| ID2 | K2 | SQN2 | sSQN2 | RAND2 |
| ID3 | K3 | SQN3 | sSQN3 | RAND3 |
| . . . | . . . | . . . | . . . | . . . |

The replay checking in the HSS 104 (typically performed in step S9), after receiving ( . . . , SQN, MAC($K_{auth}$, . . . , [RAND II]f(SQN) . . . )) may, in the example described above when f(x)=x+1 be as follows:

1. Check that (the primary) SQN is that associated with the most recent AKA
2. If so, check that f(SQN) is not in the set of previously used secondary sequence numbers for this primary SQN (e.g. check that f(SQN)>SECSQNmax)
3. If so, mark f(SQN) as used (e.g. update SECSQNmax to f(SQN)).
4. Retrieve (from signaling or storage) the $RAND_{SQN}$ associated with SQN and generate KM' from the shared key K, $RAND_{SQN}$, and possibly other parameters (e.g. f(SQN)).

It will be appreciated that, after very long amounts of time, even that the HSS may flush the extra data, f(SQN) and/or $nonce_{HSS}$ etc.

It will also be noted that, where sufficiently long (pseudo) randomly generated nonces are generated in the HSS 104, there is no need to keep track of all the nonces generated by either the HSS 104 or any other node. The reason for this is that, by including the $nonce_{HSS}$ in the key derivation, it does not matter for the HSS if any other parameter is replayed.

Use of Credentials in MD

In the discussion above it is assumed that the MD 101 has a USIM or equivalent credential based on a shared key K. This may be stored on a removable physical UICC card, on a non-removable "embedded SIM" (eSIM), or as a "Soft SIM" solution, e.g. using a general purpose trusted execution environment.

It will be note that, in step S6, the MD 101 uses a key $K_{auth}$ to authenticate itself towards the HSS 104. If $K_{auth}$ is based on the previous KM key, this means that the MME 102 could potentially fake the re-generation request (or even the presence) of the MD. If this is an issue, the key $K_{auth}$ should be derived from some key known only to the HSS and MD, e.g. KA.

If $K_{auth}$ is derived from KA, not even the MME can lie about the request coming from the MD. Conversely, the MD cannot claim that it was not present, i.e. cannot repudiate this fact.

Mobility

It will be noted that, if the MD 101 is moving, the MME 102 to which the MD 101 initially authenticated may be different from the MME which services the MD 101 when the MD 101 comes to life next time. In the current 3GPP solutions, the new MME would try to fetch the context/key from the old MME. This means that, even if the old MME has a context in store, there could be a risk that it has been compromised from security point of view. This insecurity would then transfer to the new MME.

The process described above makes it possible to avoid this if the HSS 104 derives a new fresh key KM' for the target MME which does not depend on the previous KM. This key could be tied uniquely to each MME. e.g.

$KM'=KDF(KA, . . . ,MME_{ID}, . . . )$.

A problem with this approach is that the MD 101 may not know the new MME identity. Pooling of MMEs may further complicate the matter. A way around the problem in some situations is that the MME includes its identity in a message to the MD 101. If this is done, one may just as well just use a randomly generated number, and in that way avoid leaking the network topology to the MD.

Thus it can be seen that the invention, at least in preferred embodiments, enables the MME to remove unnecessary security context data for inactive MDs, yet allowing a fast re-establishment of a (new) security context when needed. MDs need not re-run the AKA procedure every time they need secure communication.

Figure 4:
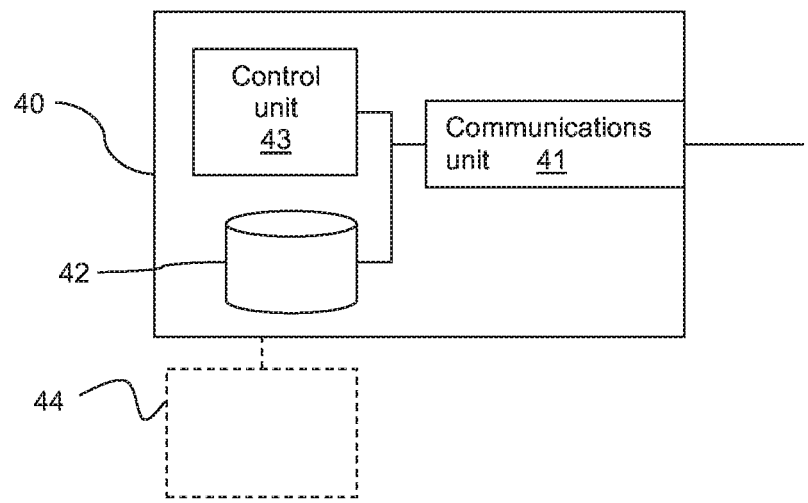
FIG. 4 is a schematic illustration of a device such as a mobile device or MD.

FIG. 4 is a schematic illustration of an exemplary device 40 which could for example be the MD 101 shown in FIG. 1. The device includes a communications unit 41 for sending and receiving data, a storage unit 42 for storing data, and a control unit 43 for controlling the operation of the communications unit 41 and storage unit 42. It will be appreciated that the control unit 43 can be operated by hardware or software. The control unit 43 enables the device to carry out the operations described above. A storage unit as well as at least some of the security related processing may at least partially be implemented in a tamper resistant smart card module (e.g. SIM, ISIM, USIM) 44, holding secret keys associated with the user (and which are also shared with the authentication server). This smart card module 44 may be removably attached to the rest of user equipment 10.

Figure 5:
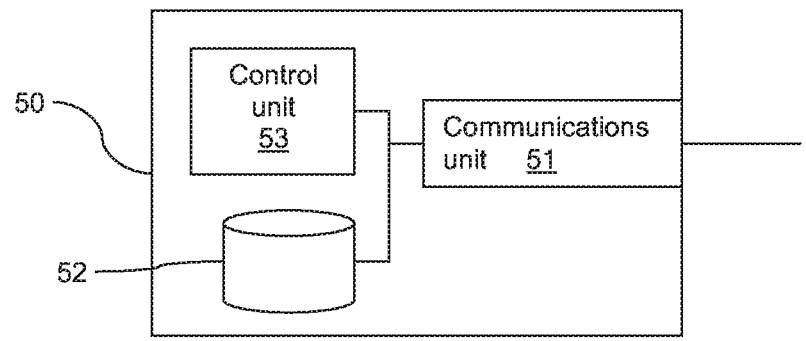
FIG. 5 is a schematic illustration of a serving network node.

FIG. 5 is a schematic illustration of an exemplary serving network node 50 which could for example be the MME 102 shown in FIG. 1. The node 50 includes a communications unit 51 for sending and receiving data, a storage unit 52 for storing data, and a control unit 53 for controlling the operation of the communications unit 51 and storage unit 52. It will be appreciated that the control unit 53 can be operated by hardware or software. The control unit 53 enables the serving network node 50 to carry out the operations described above.

Figure 6:
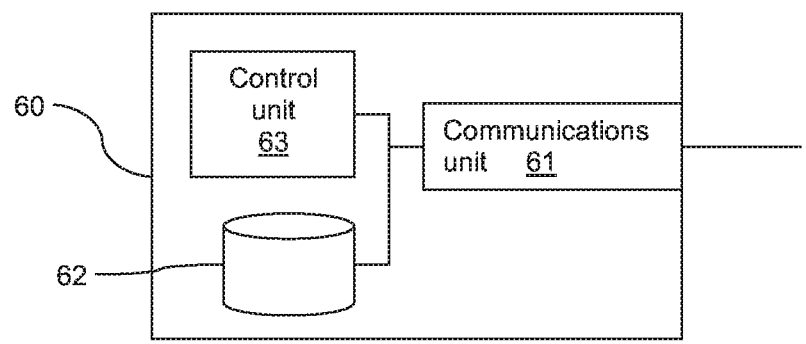
FIG. 6 is a schematic illustration of an authentication server.

FIG. 6 is a schematic illustration of an exemplary authentication server 60 which could for example be the HSS 104 shown in FIG. 1. The authentication server 60 includes a communications unit 61 for sending and receiving data, a storage unit 62 for storing data, and a control unit 63 for controlling the operation of the communications unit 61 and storage unit 62. It will be appreciated that the control unit 63 can be operated by hardware or software. The control unit 63 enables the authentication server 60 to carry out the operations described above.

It will be appreciated that variations from the above described embodiments may still fall within the scope of the invention. For example, the process is described with the MME deleting the security context after a predetermined time. It might be envisaged that it is known, when the AKA procedure is carried out, that the MD might have data to send at some time in the future, but has no data to send at the present time. In this situation, it might be that the MME does not store the security context at all, rather than waiting a predetermined time before deleting some or all of it.

What is claimed is:

1. A method for a mobile device a to reestablish a previously-established security context without performing an Authentication and Key Agreement (AKA) procedure, after at least a portion of the previously-established security context has been deleted by a communication network, the method comprising:
   establishing AKA based security contexts with the communication network from time to time, based on performing corresponding AKA procedures with the communication network, each AKA procedure involving the derivation of corresponding session keys at the mobile device and at the communication network according to a shared secret known a priori at the mobile device and at the communication network, said corresponding session keys used for securing data exchanged during the established security context; and
   at one or more instances after the performance of a preceding AKA procedure and before the performance of a next, succeeding AKA procedure, re-establishing the security context from the preceding AKA procedure using re-use information saved from the preceding AKA procedure, wherein the re-use information depends on a sequence number assigned by the communication network to identify the preceding AKA procedure, and wherein re-establishing the security context from the preceding AKA procedure comprises, for each instance of re-establishment:
      forming a context regeneration request that includes synchronization information particularly identifying each instance of re-establishment and dependent on the sequence number assigned to the preceding AKA procedure and on any previous instances of re-establishing the security context;
      sending the context regeneration request to the communication network;
      receiving a nonce or other authentication value from the communication network in response to the context regeneration request; and
      generating a new session key to use at the mobile device for securing data exchanged during the re-established security context, based on the received authentication value and the shared secret.

2. The method of claim 1, wherein at least the first instance of re-establishing the security context from the preceding AKA procedure using the re-use information saved from the preceding AKA procedure comprises determining that the security context requires refreshing, based on expiration of a timer or based upon signaling received from the communication network.

3. The method of claim 1, further comprising generating the synchronization information such that, for each instance of re-establishing the security context from the preceding AKA procedure, the synchronization information reflects how many times the security context has been re-established, or otherwise uniquely identifies each re-use of the re-use information to the communication network.

4. The method of claim 1, wherein the re-use information comprises a random value received from the communication network for use in establishing the security context during the preceding AKA procedure, along with the session key generated by the mobile device for the security context, and wherein the context regeneration request comprises a message authentication code that depends on the session key.

5. A mobile device configured to reestablish a previously-established security context without performing an Authentication and Key Agreement (AKA) procedure, after at least a portion of the previously-established security context has been deleted by a communication network, the mobile device comprising:
   a communication transceiver configured for sending signaling to and receiving signaling from the communication network; and
   processing circuitry configured to:
      establish AKA based security contexts with the communication network from time to time, based on performing corresponding AKA procedures with the communication network, each AKA procedure involving the derivation of corresponding session keys at the mobile device and at the communication network according to a shared secret known a priori at the mobile device and at the communication network, said corresponding session keys used for securing data exchanged during the established security context; and
      at one or more instances after the performance of a preceding AKA procedure and before the performance of a next, succeeding AKA procedure, re-establish the security context from the preceding AKA procedure using re-use information saved from the preceding AKA procedure, wherein the re-use information depends on a sequence number assigned by the communication network to identify the preceding AKA procedure, and wherein the processing circuitry re-establishes the security context from the preceding AKA procedure for each instance of re-establishment, based on being configured to:
- form a context regeneration request that includes synchronization information particularly identifying each instance of re-establishment and dependent on the sequence number assigned to the preceding AKA procedure and on any previous instances of re-establishing the security context;
- send the context regeneration request to the communication network;
- receive a nonce or other authentication value from the communication network in response to the context regeneration request; and
- generate a new session key to use at the mobile device for securing data exchanged during the re-established security context, based on the received authentication value and the shared secret.

6. The mobile device of claim 5, wherein, for at least the first instance of re-establishing the security context from the preceding AKA procedure using re-use information saved from the preceding AKA procedure, the processing circuitry is configured to determine that the security context requires refreshing, based on expiration of a timer or based upon signaling received from the communication network.

7. The mobile device of claim 5, wherein the processing circuitry is configured to generate the synchronization information such that, for each instance of re-establishing the security context from the preceding AKA procedure, the synchronization information reflects how many times the security context has been re-established, or otherwise uniquely identifies each re-use of the re-use information to the communication network.

8. The mobile device of claim 5, wherein the re-use information comprises a random value received from the communication network for use in establishing the security context during the preceding AKA procedure, along with the session key generated by the mobile device for the security context, and wherein the context regeneration request comprises a message authentication code that depends on the session key.

9. A method at an authentication server for reestablishing a previously-established security context without performing an Authentication and Key Agreement (AKA) procedure, after at least a portion of the previously-established security context has been deleted by a communication network, the method comprising:
- establishing a security context with a mobile device, based on performing an AKA procedure in dependence on a shared secret known a priori to the authentication server and a mobile device, including providing a session key generated by the authentication server to another network entity operative to secure communications between the mobile device and the communication network;
- saving a sequence number assigned to and identifying this particular performance of the AKA procedure with respect to the mobile device; and
- after establishing the security context and before performing another AKA procedure with the mobile device, re-establishing the security context for the mobile device at each of one or more instances, based on:
  - receiving from the other network entity a request to reestablish the security context, wherein the request includes synchronization information from the mobile device;
  - evaluating the synchronization information to determine whether or not the synchronization information includes or correctly derives from the sequence number assigned to the AKA procedure and correctly indicates this particular instance of re-establishment; and
  - responsive to verification of the synchronization information, generating a new session key based on the shared secret, for the other network entity to use for securing data exchanged with the mobile device during the re-established security context, and updating a re-establishment count or other value saved at the authentication server, for use in verifying any next request to re-establish the security context with the mobile device.

10. The method of claim 9, wherein the request includes a message authentication code from the mobile device that includes or otherwise depends on a random value originally generated by the authentication server during the AKA procedure, for key derivation by the mobile device, and includes the sequence number assigned to the AKA procedure, or a value derived therefrom.

11. An authentication server configured to reestablish a previously-established security context without performing an Authentication and Key Agreement (AKA) procedure, after at least a portion of the previously-established security context has been deleted by a communication network, the authentication server comprising:
- a communication interface configured to communicate with another network entity that is operative to secure communications between a mobile device and the communication network; and
- processing circuitry operatively associated with the communication interface and configured to:
  - establish a security context with the mobile device, based on performing an AKA procedure in dependence on a shared secret known a priori to the authentication server and the mobile device, including providing a session key generated by the authentication server to the other network entity for use in securing data exchanged between the communication network and the mobile device during the security context;
  - save a sequence number assigned to and identifying this particular performance of the AKA procedure with respect to the mobile device; and
  - after establishing the security context and before performing another AKA procedure with the mobile device, re-establish the security context for the mobile device at each of one or more instances, based on being further configured to:
    - receive from the other network entity a request to reestablish the security context, wherein the request includes synchronization information from the mobile device;
    - evaluate the synchronization information to determine whether or not the synchronization information includes or correctly derives from the sequence number assigned to the AKA procedure and correctly indicates this particular instance of re-establishment; and responsive to verification of the synchronization information, generate a new session key based on the shared secret, for the other network entity to use for securing data exchanged with the mobile device during the re-established security context, and update a re-establishment count or other value saved at the authentication server, for use in verifying any next request to re-establish the security context with the mobile device.

12. The authentication server of claim 11, wherein the request includes a message authentication code from the mobile device that includes or otherwise depends on a random value originally generated by the authentication server during the AKA procedure, for key derivation by the mobile device, and includes the sequence number assigned to the AKA procedure, or a value derived therefrom.

* * * * *